US005451151A

United States Patent [19]
Russell

[11] Patent Number: 5,451,151
[45] Date of Patent: Sep. 19, 1995

[54] APPARATUS FOR MOLDING FOAM ARTICLES

[75] Inventor: Robert O. Russell, Pinckney, Mich.

[73] Assignee: Hoover Universal, Inc., Plymouth, Mich.

[21] Appl. No.: 202,803

[22] Filed: Feb. 28, 1994

[51] Int. Cl.⁶ .................................................. B28B 1/50
[52] U.S. Cl. ................................. 425/4 R; 425/450.1;
425/451; 425/451.9; 425/589; 425/595;
425/817 R; 249/139; 249/160; 249/165;
249/166; 249/167; 249/170; 264/45.2
[58] Field of Search ................ 425/4 R, 817 R, 451.9,
425/451, 450.1; 249/160, 139, 165, 166, 167,
170; 264/45.2

[56] References Cited

U.S. PATENT DOCUMENTS

| | | | |
|---|---|---|---|
| 3,611,499 | 10/1971 | Getty | 425/451.9 |
| 4,191,523 | 3/1980 | Niederst | 425/195 |
| 4,318,682 | 3/1982 | Larson | 425/451.9 |
| 4,551,290 | 11/1985 | Mizell | 249/160 |
| 4,908,216 | 3/1990 | Dullings | 425/451.9 |

FOREIGN PATENT DOCUMENTS

| | | | |
|---|---|---|---|
| 1803563 | 5/1970 | Germany | 249/170 |
| 2027934 | 6/1970 | Germany | 264/45.2 |
| 58-110234 | 6/1983 | Japan . | |
| 5-84765 | 4/1993 | Japan | 425/451.2 |
| 1429475 | 3/1976 | United Kingdom | 249/165 |
| 2092509 | 8/1982 | United Kingdom . | |
| 2100175 | 12/1982 | United Kingdom | 425/817 R |
| 793793 | 1/1981 | U.S.S.R. | 249/170 |

Primary Examiner—Jay H. Woo
Assistant Examiner—Vi Duong Dang
Attorney, Agent, or Firm—Harness, Dickey & Pierce

[57] ABSTRACT

A foam molding apparatus with improved seal for sealing the mold lid to the bowl. The bowl and lid include inclined sealing surfaces surrounding the mold cavity with the bowl sealing surfaces being concave and the lid sealing surface being convex. Both the bowl and lid are resiliently supported on frames so that the lid can self align upon the bowl as the convex lid sealing surface engages the concave bowl sealing surface. Adjusting screws are carried by the lid carrier frame and engage the lid to apply pressure to the lid forcing the lid against the bowl sealing surface with the bowl being resiliently carried on a supporting frame allowing the bowl to float relative to the frame to achieve an even pressure distribution about the mold cavity at the sealing surfaces. The lid and bowl are both formed with fluid passages to enable hot water to be circulated through the mold maintaining the mold at an elevated temperature.

9 Claims, 3 Drawing Sheets

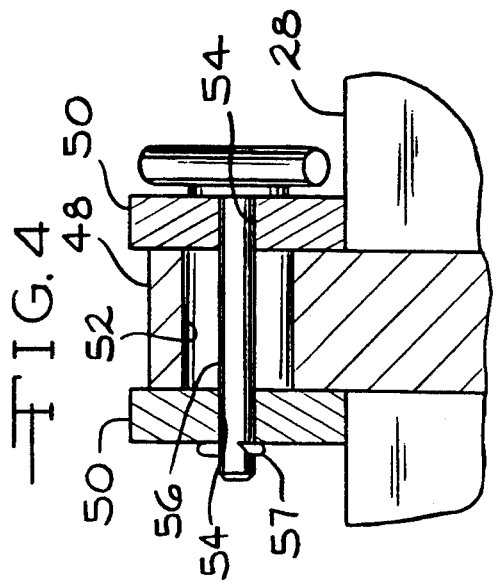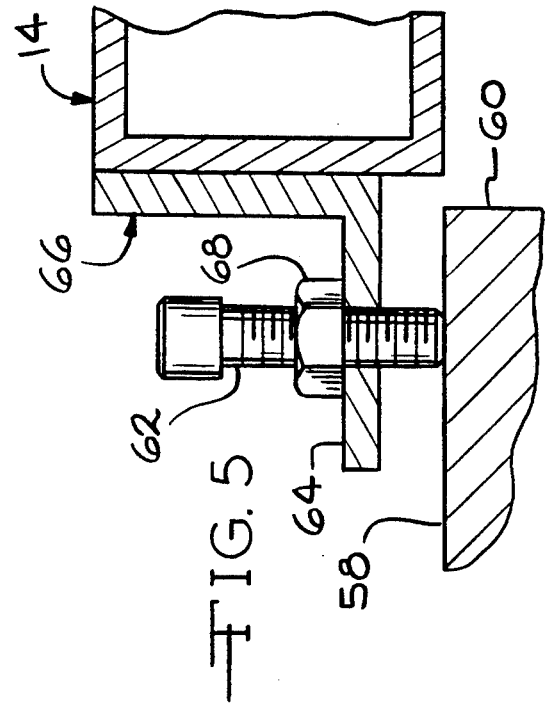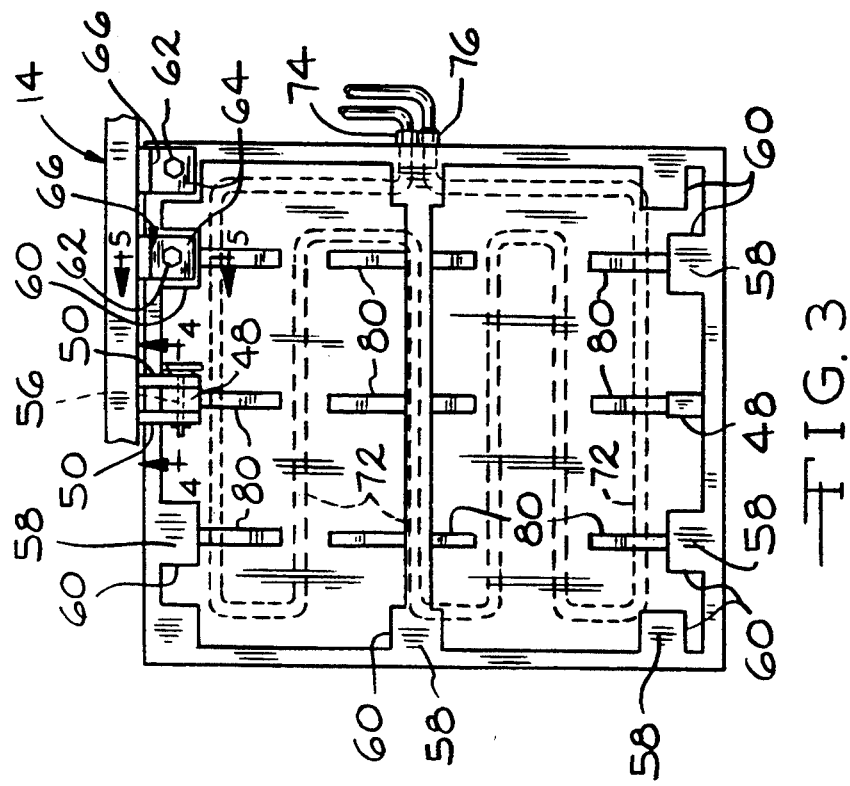

APPARATUS FOR MOLDING FOAM ARTICLES

BACKGROUND AND SUMMARY OF THE INVENTION

The present invention relates to an apparatus for molding foam articles such as foam cushions for automotive seats and in particular to an apparatus having improved means for sealing the mold lid to the mold bowl to reduce the occurrence of foam leakage from the mold.

Large foam articles such as the foam pads in automotive seats are typically formed in large molds having a lower portion called a bowl and an upper portion called a lid. The bowl and lid when closed together define a mold cavity or cavities in which foam articles are molded. The molding process is accomplished by filling the bowl with a predetermined quantity of a liquid foaming agent. The lid is then closed upon the bowl and the liquid agent reacts, over a period of time, generating gases to produce air bubbles and expands to fill the mold cavity with foam. If the lid is not properly sealed against the bowl, foam can leak from the mold cavity, between the lid and bowl, forming what is known as mold flash extending from the molded article. This mold flash is removed from the molded article by a time consuming manual cutting process.

Accordingly, it is an object of the present invention to provide an improved mold for foam articles which reduces or eliminates the foam leakage which produces mold flash.

The apparatus of the present invention forms both the bowl and the lid with inclined sealing surfaces about the perimeter of the mold cavity. The sealing surfaces are inclined generally downwardly and inwardly toward the mold cavity and form the only contact between the bowl and the lid. The lid is mounted to a carrier frame which moves the lid between open and closed positions. The lid is movably attached to the frame so as to "float" on the frame. As the inclined sealing surface of the lid contacts the inclined sealing surface of the bowl, the lid is enabled to self align upon the bowl. The carrier frame is then latched to a base frame upon which the bowl is supported. This secures the carrier frame and lower frame in position relative to one another. The bowl in turn is supported upon the base frame by a resilient support, such as an air cushion.

The upper frame carries a plurality of adjusting bolts which are threaded to the upper frame and are adjusted to bear against the upper surface of the lid. These bolts are spaced from one another and are generally located about the periphery of the mold cavity. These bolts apply pressure to the lid, preventing the lid from bending or otherwise distorting which can result in a leak between the lid and bowl.

The air cushion beneath the bowl allows the bowl to float under the pressure applied by the lid and to seek an even pressure distribution about the periphery of the mold cavity along the sealing surfaces. The result is a consistent sealing of the lid to the bowl, reducing the occurrence of leakage and mold flash. The air pressure in the cushion can be increased after the lid is latched in place to increase the pressure at the lid and bowl sealing surfaces.

Previous molds contained a fabricated steel frame between the carrier frame and the aluminum lid. The steel frame was used to attach the lid to the carrier frame. Likewise, the bowl included a fabricated steel frame for mounting the bowl on the base frame. With the mold of the present invention, all of the mounting features for the lid and bowl are cast directly into the lid and bowl, eliminating the need for the fabricated steel frames. This reduces the complexity and cost of the mold. The adjusting bolts mentioned above have previously been used between the carrier frame and the fabricated steel frame of the lid. Since the adjusting bolts on the carrier frame now bear directly against the lid, the force from these bolts is transferred to the sealing surfaces of the mold halves. With the prior use of a steel framework, the forces applied by these adjusting screws did not always translate into pressure at the mold sealing surfaces. However, the mold lid is in need of reinforcement with the adjusting screws acting directly on the lid. Gussets have been added to the lid for this purpose.

To improve the molding operation, the bowl and the lid are both equipped with fluid passages for circulating heated water or other liquid through the mold halves to maintain a predetermined mold temperature.

Further objects, features and advantages of the invention will become apparent from a consideration of the following description and the appended claims when taken in connection with the accompanying drawings.

BRIEF DESCRIPTION OF THE DRAWINGS

FIG. 3 is a top view of the lid and carrier frame;

FIG. 4 is a sectional view of the carrier frame/lid attachment as seen from substantially the line 4—4 of FIG. 3; and FIG. 5 is a sectional view of an adjusting bolt mounted to the upper frame for applying pressure to the lid as seen from substantially the line 5—5 of FIG. 3.

DETAILED DESCRIPTION OF THE PREFERRED EMBODIMENT

Figure 1:
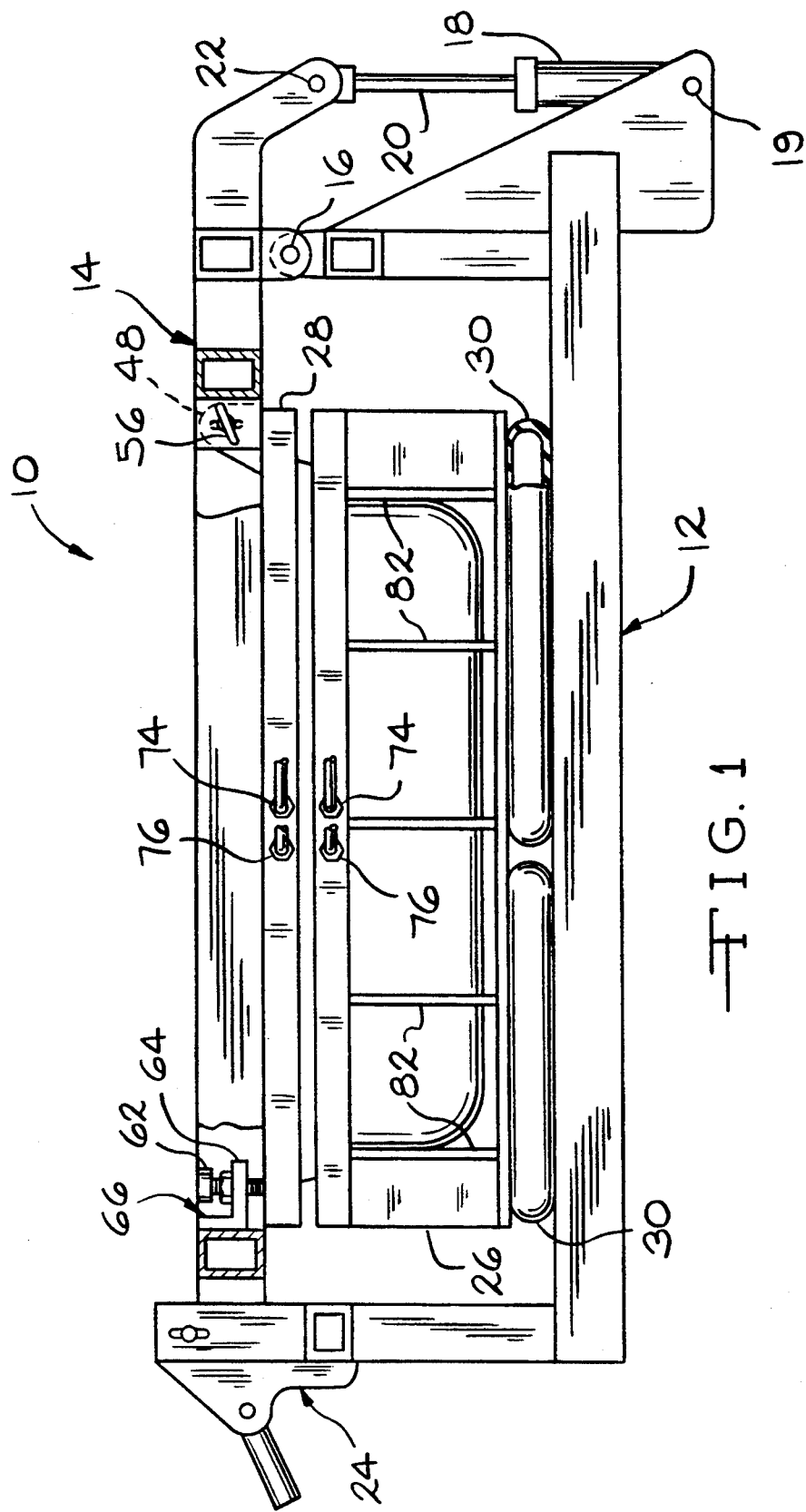
FIG. 1 is a side elevational view of the foam molding apparatus of the present invention.

The apparatus for molding foam articles of the present invention is shown in FIG. 1 and designated generally at 10. Apparatus 10 includes a lower base frame 12 and an upper carrier frame 14 which is hinged to the base frame 12 for rotation about a pivot 16. An actuating cylinder 18 is mounted to the base frame 12 at pivot 19 and has an extendable rod 20. Rod 20 is attached to the carrier frame at pivot 22. Retraction of the rod 20 into the cylinder 18 causes clockwise rotation of the carrier frame 14 about pivot 16 as viewed in FIG. 1. This raises the carrier frame 14 away from the base frame 12. A latch mechanism 24 secures the carrier frame 14 to the base frame 12 at the front of the apparatus, preventing rotation or other movement of the frame 14 relative to the base frame 12.

The base frame 12 supports a mold bowl 26 while the carrier frame 14 carries a mold lid 28. The bowl and lid cooperate together to define a mold cavity as described below in which a foam article is molded. The bowl 26 rests upon a pair of air cushions 30 which provide a resilient support for the bowl upon the frame 12. Lateral supports such as guide rods (not shown) etc., are provided to prevent side-to-side movement of the bowl relative to the frame while allowing the frame to float vertically relative to the bowl upon the air cushions.

Other resilient supports such as rubber pads, etc., can be used to support the bowl.

Figure 2:
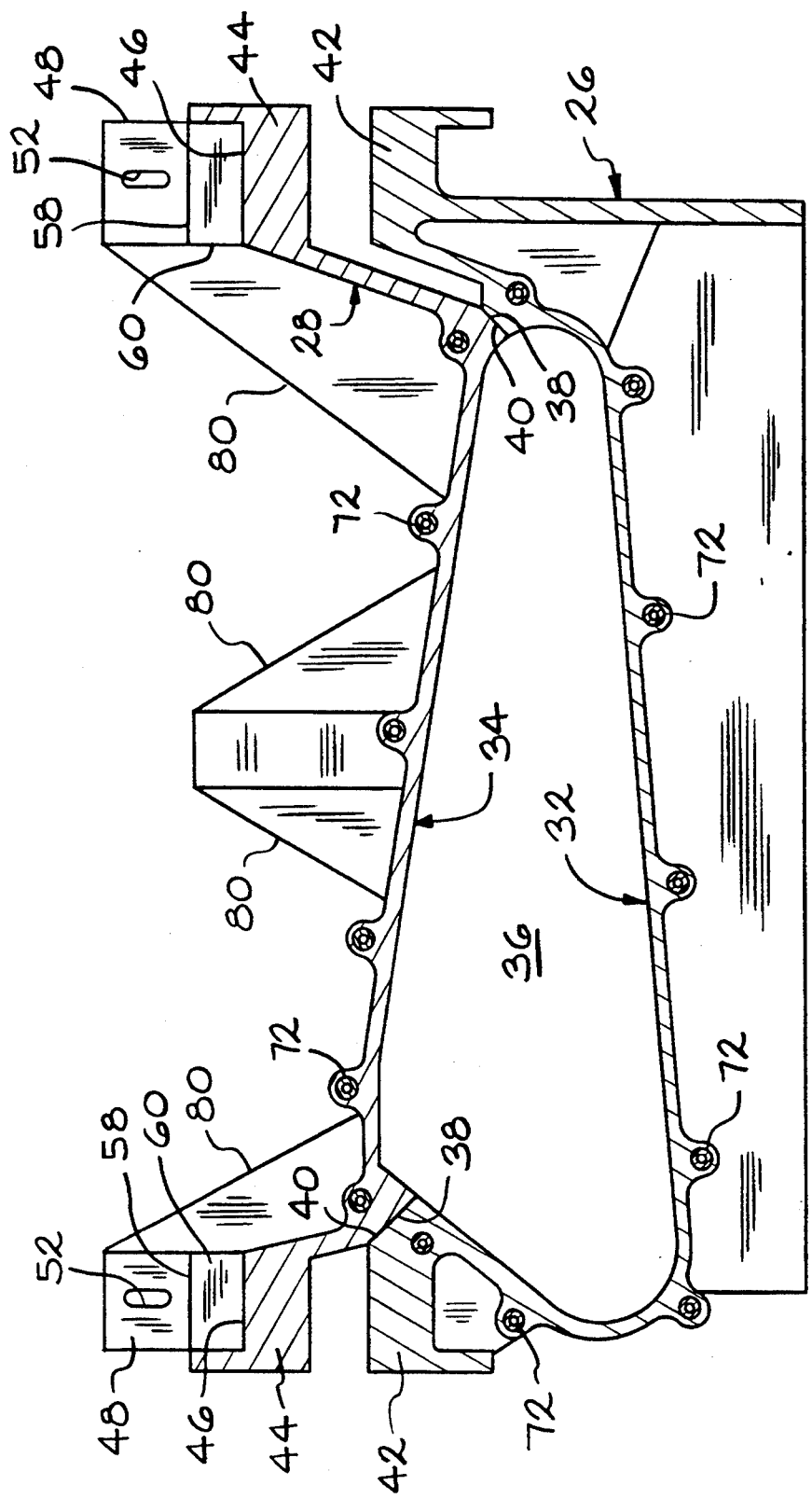
FIG. 2 is a sectional view of the bowl and lid showing the inclined sealing surfaces of the bowl and lid.

With reference to FIG. 2, the bowl 26 is shown having an inner mold surface 32 while the lid 28 has an inner mold surface 34. When the lid is in a closed position upon the bowl, the bowl and lid mold surfaces define a cavity 36 in which foam articles are molded. At the periphery of the bowl mold surface 32, the bowl has an inclined sealing surface 38. Likewise, the lid 28 has an inclined sealing surface 40 about the perimeter of the inner mold surface 34. The sealing surfaces 38 and 40 contact one another when the lid is closed upon the bowl, forming a seal about the periphery of the mold cavity 36. The sealing surfaces are preferably inclined at a 45° angle to the horizontal. The bowl sealing surface is inclined downwardly into the bowl mold cavity and is thus generally concave. The lid sealing surface is shaped complementary, forming a generally convex surface. The inclined sealing surfaces 38 and 40 are formed by a precision machining operation such as electrodischarge machining to ensure a tight fitting seal between the lid and bowl.

The bowl 26 is formed with a flange 42 extending outwardly about its periphery while the lid 28 is formed with a flange 44 extending outwardly about its periphery having a top surface 46.

With reference to FIGS. 3 and 4, the attachment of the lid 28 to the carrier frame 14 is shown in greater detail. The lid 28 is made of cast aluminum and is formed with a plurality of mounting flanges 48, one of which is shown in FIG. 3, which extend from the top surface 46 of the lid flange and contain slotted bores 52. The lid mounting flanges are disposed between pairs of spaced mounting flanges 50 of the carrier frame 14. The carrier frame mounting flanges 50 have bores 54 which are aligned with the bore 52 in the lid mounting flange. A stud 56 extends through the bores 52 and 54 to mount the lid to the frame 14 and is retained by a pin 57. The bore 52 in the lid flange, however, is slotted to allow the lid 28 limited movement relative to the frame 14. This freedom of movement of the lid enables the lid to self align on the bowl by interaction of the inclined sealing surfaces of the bowl and the lid. As the lid is lowered onto the bowl, the lid will move relative to the carrier frame to align the lid sealing surface with the bowl sealing surface.

The lid is cast with a plurality of aluminum bosses 60 in the form of blocks raised above the lid flange 44. The blocks are machined to provide precision surfaces 58 at spaced locations about the periphery of the lid. The bosses form contact surfaces for adjusting bolts 62 attached to the frame 14. The bolts 62 are threaded through plates 64 of mounting brackets 66 which are attached to the carrier frame 14. Lock nuts 68 tighten the bolts on the mounting brackets to hold the bolts in their adjusted positions. When the lid is closed upon the bowl and the carrier frame 14 is secured to the base frame 12 by the latch 24, the bolts 62 engage the surfaces 58 of the aluminum bosses 60 and apply forces to the lid. The bolts 62 apply the forces directly onto the aluminum lid and hold the lid in place against the sealing surface 38 of the bowl. The bolts 62 prevent distortion of the lid, maintaining the sealed relationship between the lid and the bowl.

The lid 28 is reinforced by gussets 80 on the top of the lid. The gussets strengthen the cast aluminum lid since the lid is no longer made with a fabricated steel frame to attach the lid to the carrier frame. Likewise, the bowl 26 is reinforced with a plurality of gussets 82.

The air cushions 30 beneath the bowl 26 enable the bowl to float relative to the base frame 12 and achieve an equal pressure distribution about the periphery of the mold cavity at the sealing surfaces. After the carrier frame is latched to the base frame, the air pressure in the cushions 30 can be increased to increase the pressure between the lid and the bowl at the sealing surfaces 38 and 40. The apparatus of the present invention thus reduces the occurrence of mold flash reducing the need for time consuming hand removal of the flash. In addition, by eliminating the fabricated steel frame between the carrier frame and lid, the mold construction is simplified.

Both the bowl and the lid have a plurality of fluid conduits 72 for the circulation of a heated liquid, such as water, through the conduits to maintain the temperature of the bowl. The conduits 72 are connected to water inlets 74 and outlets 76 for circulating the water through the mold. By maintaining the mold at a heated temperature, foam curing is facilitated. The use of the heated water enables the molds to be maintained at this temperature rather than to repeatedly heat and cool the molds.

It is to be understood that the invention is not limited to the exact construction illustrated and described above, but that various changes and modifications may be made without departing from the spirit and scope of the invention as defined in the following claims.

I claim:

1. An apparatus for molding foam articles comprising:
    a mold having a lower bowl and an upper lid movable with respect to said bowl between open and closed positions, said lid resting upon said bowl in said closed position, said bowl and said lid each having inner mold surfaces which together define a mold cavity in which said foam articles are molded when said lid is in said closed position, said lid inner mold surface being surrounded by a lid sealing surface and said bowl inner mold surface being surrounded by a bowl sealing surface, said lid and said bowl sealing surfaces engaging one another surrounding said cavity to close said cavity, said lid further having a top surface opposite said lid inner mold surface;
    a base frame for supporting said bowl;
    resilient means between said bowl and said base frame for resiliently supporting said bowl upon said base frame;
    a carrier frame supporting said lid and moving said lid between said open and closed positions, said lid being mounted to said carrier frame for limited movement of said lid relative to said carrier frame;
    latch means for securing said carrier frame to said base frame when said lid is in said closed position to prevent relative movement between said carrier frame and said base frame;
    means mounted to said carrier frame and engageable with said lid top surface when said lid is in said closed position for resisting upward forces applied to said lid through said bowl by said resilient means whereby said lid and bowl sealing surfaces are held in engagement with one another and;
    said bowl sealing surface being inclined downwardly into said bowl inner mold surface forming a concave surface surrounding said bowl inner mold surface and said lid sealing surface being complementary to said bowl sealing surface forming a convex surface surrounding said lid inner mold surface whereby with said movement of said lid relative to said carrier frame, said lid is self defining with said bowl as said lid is moved into said closed position upon said bowl.

2. The apparatus of claim 1 wherein said lid and bowl sealing surfaces are inclined at approximately a forty five degree angle to the horizontal when said lid is in said closed position.

3. An apparatus for molding foam articles comprising:

a mold having a lower bowl and an upper lid movable with respect to said bowl between an open position spaced from said bowl and a closed position resting upon said bowl, said bowl and said lid each having inner mold surfaces which together define a mold cavity when said lid is in said closed position in which said foam articles are molded, said lid inner mold surface being surrounded by a lid sealing surface and said bowl inner mold surface being surrounded by a bowl sealing surface, said lid and said bowl sealing surfaces engaging one another surrounding said cavity to close said cavity, said lid further having a top surface opposite said lid inner mold surface;

a carrier frame to which said lid is mounted for moving said lid between said open and closed positions;

lock means for locking said carrier frame in place when said lid is in said closed position on said bowl;

said lid being a cast aluminum body including a plurality of projecting mounting flanges each containing a through bore for mounting said lid to said carrier frame and said cast aluminum body further having mounting bosses on said top surface defining contact surfaces;

mounting studs carried by said carrier frame and extending through said bores in said lid mounting flanges to mount said lid to said carrier frame, said through bores in said mounting flanges being larger in size than said mounting studs to enable limited movement of said lid relative to said carrier frame; and adjusting screws mounted on said carrier frame and positioned to engage said contact surfaces of said bosses to apply pressure to said lid when said carrier fame is locked in place and said lid is in said closed position upon said bowl to hold said lid in engagement with said bowl.

4. The apparatus of claim 3 wherein said lid and bowl sealing surfaces are inclined to the horizontal and extend downwardly and inwardly toward said mold cavity.

5. The apparatus of claim 4 wherein said lid and bowl sealing surfaces are inclined at approximately a forty five degree angle to the horizontal.

6. The apparatus of claim 4 further comprising:
a base frame beneath said bowl; and
mounting means between said bowl and said base frame for resiliently mounting said bowl upon said base fame to enable said bowl to float under the pressure applied to said bowl from said lid through said sealing surfaces.

7. The apparatus of claim 6 wherein said lock means for locking said carrier frame in place when said lid is in said closed position locks said carrier frame to said base frame.

8. The apparatus of claim 3 further comprising a fluid passage within said cast aluminum body of said lid, said passage having two ends, a fluid inlet connected to one of said passage ends and a fluid outlet connected to the other end of said passage for circulating a heated fluid through said passage to heat said lid.

9. The apparatus of claim 8 wherein said bowl is a cast aluminum body having a bowl fluid passage therein, said bowl passage having two ends, a fluid inlet connected to one of said bowl passage ends and a fluid outlet connected to the other end of said bowl passage for circulating a heated fluid through said bowl passage to heat said bowl.

* * * * *

UNITED STATES PATENT AND TRADEMARK OFFICE
CERTIFICATE OF CORRECTION

PATENT NO. : 5,451,151
DATED : Sep. 19, 1995
INVENTOR(S) : Robert O. Russell

It is certified that error appears in the above-indentified patent and that said Letters Patent is hereby corrected as shown below:

Column 5, line 5, Claim 1, "defining" should be --aligning--.

Signed and Sealed this

Second Day of April, 1996

Attest:

BRUCE LEHMAN

Attesting Officer    Commissioner of Patents and Trademarks